United States Patent [19]

Taki et al.

[11] Patent Number: 4,654,798
[45] Date of Patent: Mar. 31, 1987

[54] SYSTEM OF SIMULTANEOUS TRANSLATION INTO A PLURALITY OF LANGUAGES WITH SENTENCE FORMING CAPABILITIES

[75] Inventors: Hirokazu Taki, Amagasaki; Toyohiro Kobayashi, Shizuoka; Akihiko Naito, Tokyo; Yoshikazu Morino, Nagaokakyo, all of Japan

[73] Assignee: Mitsubishi Denki Kabushiki Kaisha, Tokyo, Japan

[21] Appl. No.: 640,575

[22] Filed: Aug. 14, 1984

[30] Foreign Application Priority Data

Oct. 17, 1983 [JP] Japan ................. 58-193811

[51] Int. Cl.⁴ .................. G06F 15/38; G06F 13/00
[52] U.S. Cl. ................................ 364/419; 434/156
[58] Field of Search .............. 364/419; 434/156, 157

[56] References Cited

U.S. PATENT DOCUMENTS

| 4,328,562 | 5/1982 | Hashimoto | 364/900 |
|---|---|---|---|
| 4,367,537 | 1/1983 | Yoshida | 364/900 |
| 4,383,306 | 5/1983 | Morimoto | 364/900 |
| 4,475,171 | 10/1984 | Kanou | 364/419 |
| 4,507,750 | 3/1985 | Frantz | 364/419 |
| 4,509,137 | 4/1985 | Yoshida | 364/900 |
| 4,509,138 | 4/1985 | Hayashi | 364/900 |
| 4,541,069 | 9/1985 | Kanou | 364/419 |

Primary Examiner—Jerry Smith
Assistant Examiner—Gail Hayes
Attorney, Agent, or Firm—Lowe Price Leblanc Becker & Shur

[57] ABSTRACT

A sentence forming apparatus forms a plurality of semantically equivalent sentences simultaneously in a plurality of languages by a conversational system. The apparatus includes a semantic dictionary memory which stores a plurality of indexes in a first language, a plurality of words in the first language semantically in coordination respectively with the indexes and grammatical information relating to the respective words, and first language syntax dictionary memory and second language syntax dictionary memory which store information concerning grammatical syntax and word in the corresponding language. A selection menu is formed based on the contents of the semantic dictionary. The apparatus further includes first language sentence assembler and second language sentence assembler which assemble, respectively, the first language sentence and the second language sentence utilizing the information concerning the grammatical syntax and word in the respective languages, in accordance with the selection menu.

3 Claims, 18 Drawing Figures

FIG.6A

| SPELLING OF WORD |
|---|
| PART OF SPEECH |
| PAST TENSE |
| PERFECT TENSE |
| ⋮ |
| SENTENCE PATTERN CODE |
| ⋮ |

| iku |
|---|
| doshi |
| itta |
| itte shimatta |
| ⋮ |
| 1 gata |
| ⋮ |

13a

| go |
|---|
| VERB |
| went |
| gone |
| ⋮ |
| SVO |
| ⋮ |

| FIRST PATTERN |
|---|
| SUBJECT NOUN |
| POSTPOSITIONAL AUXILIARY WORD |
| OBJECT NOUN |
| POSTPOSITIONAL AUXILIARY WORD |
| VERB |

13a

| SVO |
|---|
| SUBJECT NOUN |
| VERB |
| OBJECT NOUN |

13b

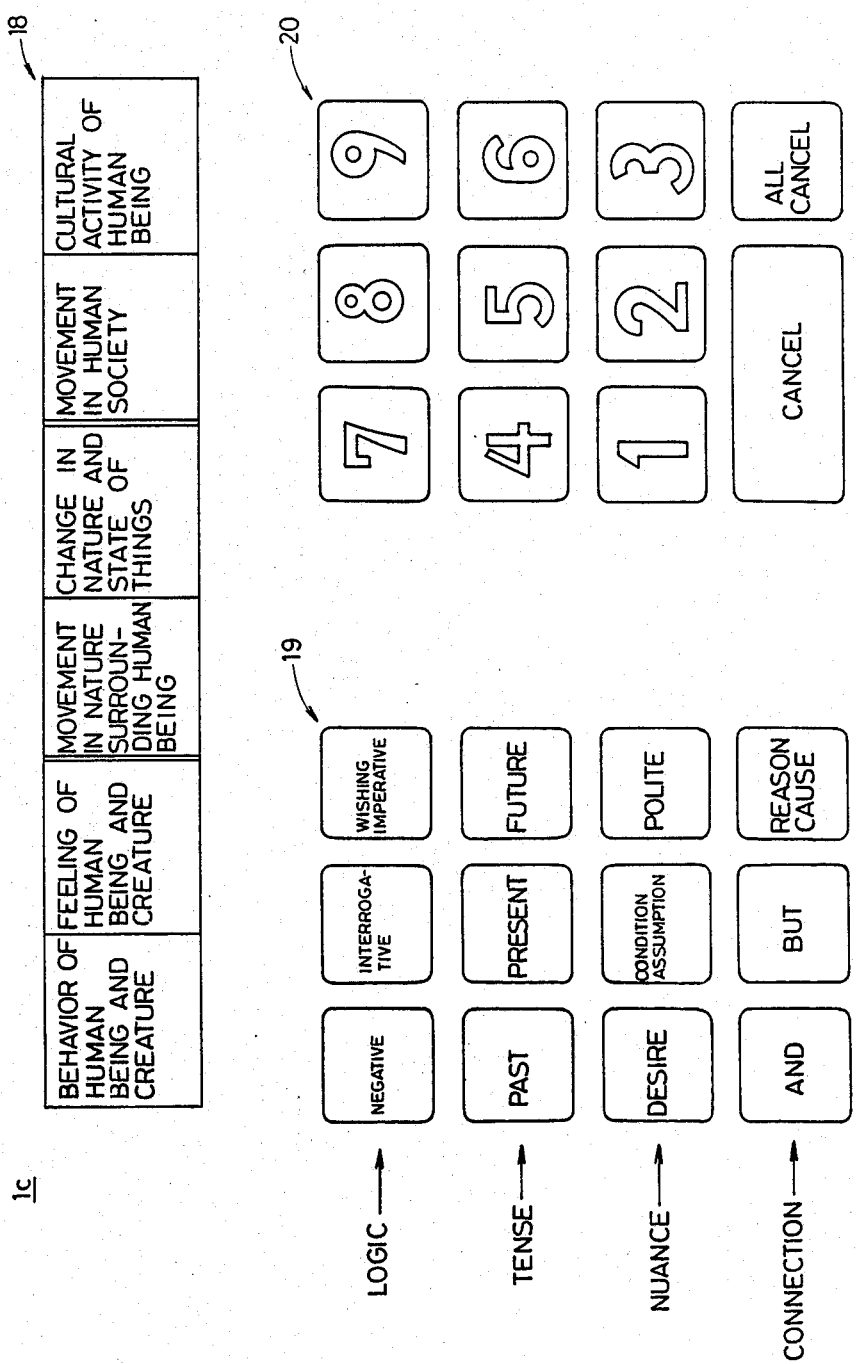

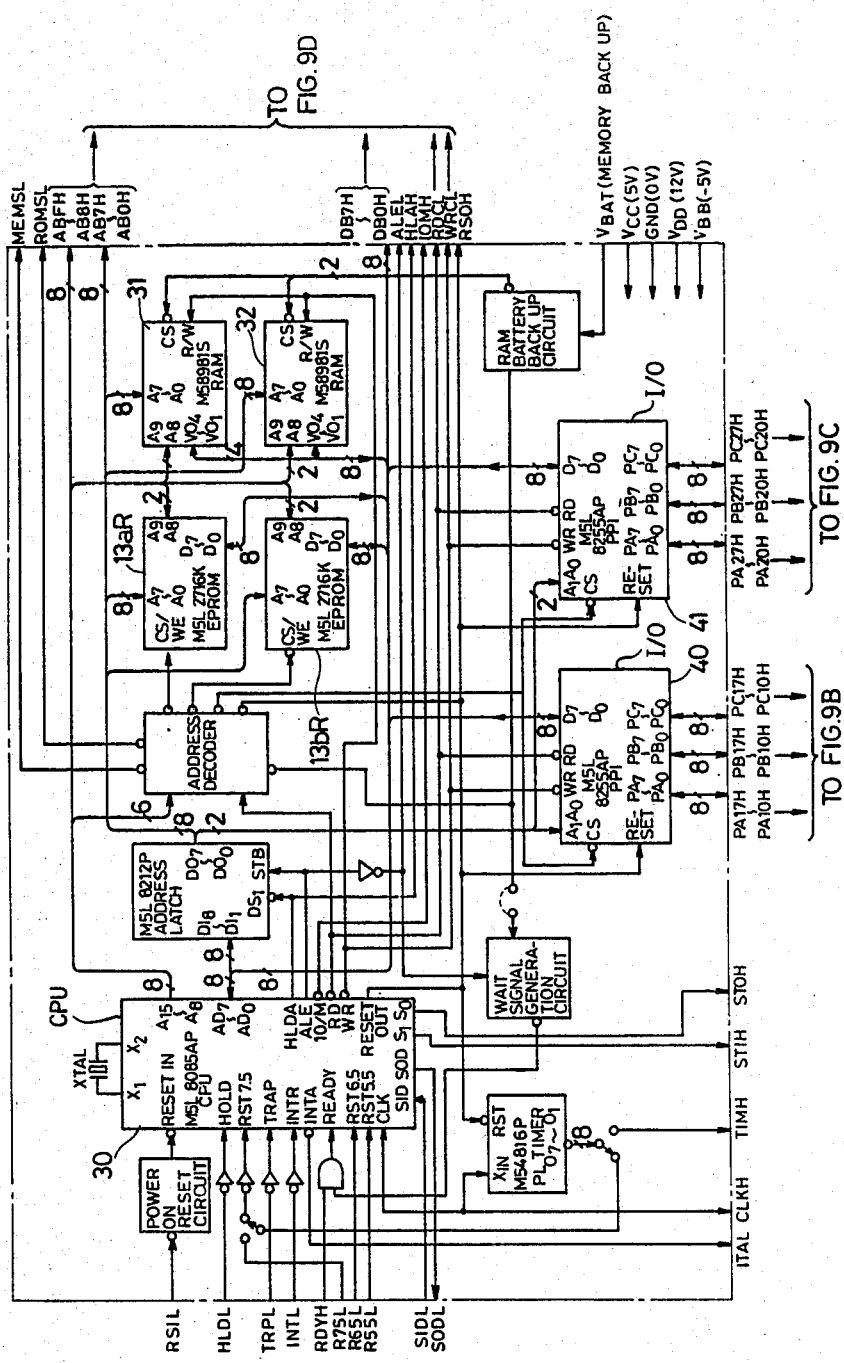

FIG.10.B
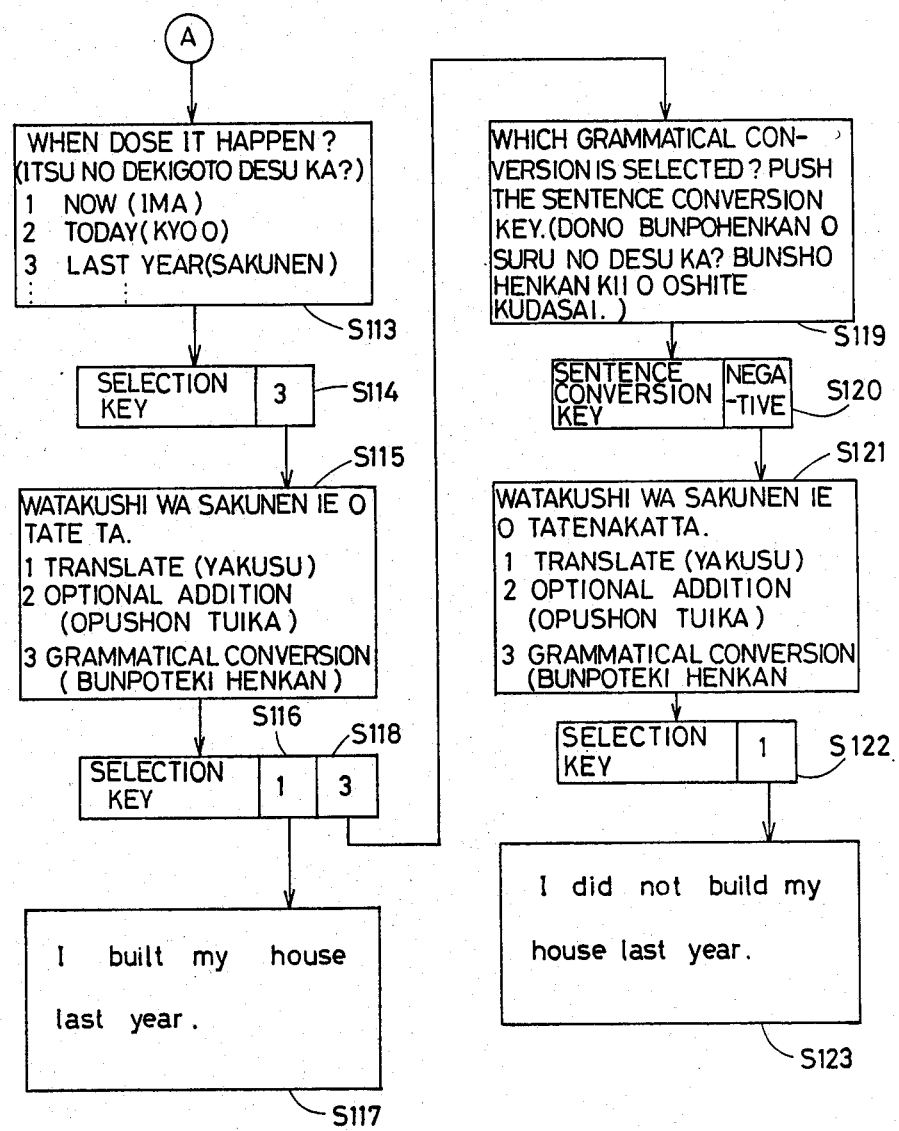

SYSTEM OF SIMULTANEOUS TRANSLATION INTO A PLURALITY OF LANGUAGES WITH SENTENCE FORMING CAPABILITIES

BACKGROUND OF THE INVENTION

1. Field of the Invention

The present invention relates to a sentence forming apparatus, and more particularly, it relates to an apparatus for forming a plurality of semantically equivalent sentences simultaneously in a plurality of languages by a conversational system.

2. Description of the Prior Art

In general, two systems have been proposed in the art for forming sentences. One is called a translation system, in which a sentence of a target language is formed by expressing the object content in a sentence formed by another language, which another language is syntactically analyzed to reconstruct a sentence by the result of the syntax analysis, thereby obtaining the object sentence in the target language. Another system is called a one-to-one coordination system, in which sentences in a target language are formed by preparing sentences in one-to-one coordination with the subject sentences in another language, from which one sentence is selected to partially replace words included therein for obtaining the object sentences. These systems are hereafter explained in further detail.

FIG. 1 is an illustration showing the conventional translation system. An input device 1 is connected to a syntax analyzer 3, which in turn is connected to an internal expression storage control device 4. The internal expression storage control device 4 is connected to a sentence assembler 5, which is connected to an output device 7. An A-language sentence 2 is an input language sentence which is, e.g., a Japanese sentence. A B-language sentence 6 is a target language sentence which is, e.g., an English sentence. The input device 1 comprises a keyboard according to, e.g., Japanese Industrial Standard (SIS) or American Standard Code for Information Interexchange (ASCII), for input operation in a character level. The syntax analyzer 3 syntactically analyzes the A-language sentence 2. The internal expression storage control device 4 stores the result of analysis in the syntax analyzer 3. The sentence assembler 5 assembles a sentence by the data in the internal expression storage control device 4. The output device 7 outputs the sentence assembled in the sentence assembler 5.

The A-language sentence 2 inputted by the keyboard in character units is syntactically analyzed by the syntax analyzer 3, to be converted into an internal expression depending on the device. The converted internal expression is stored in the internal expression storage control device 4. The subject internal expression is then converted into the B-language sentence 6, which in turn is outputted from the output device 7.

Such a conventional translation system has serious disadvantages as follows:

(a) For inputting characters, there has been required, in the keyboard, operation of a plurality of key elements such as alphabet keys, numeral keys and Japanese Kana keys. Such a requirement causes users much trouble in time and operation procedure for inputting a sentence. Particularly for those who are not accustomed to the keyboard arrangement, a rather great effort is required for finding necessary characters on the keyboard.

(b) With respect to the syntax analyzer 3, there are the following disadvantages:

($b_1$) Since the A-language sentence is inputted by character columns, there have been indispensably required grammatical analyzing processes such as recognition of words, a "Kiridashi" process (a process for writing the sentence with a space between words), consulting to a dictionary and determination in accidence. However, generally a natural language inputted in the device has, as a matter of course, various sentence structures for expressing the same meaning or purport, diversity of which cannot be processed by the system.

($b_2$) When the A-language sentence is still to be analyzed by the conventional translation system, it is necessary to provide the grammatical syntax analyzer with a device for semantic analysis to specify a single meaning or purport from the inputted character columns alone. Further, for operating such a device, a dictionary is required to deal with the character columns formed by the natural language with respect to all things in nature, inevitably leading to incalculable contents of the dictionary.

A problem common in the above items $b_1$ and $b_2$ is that it is extremely difficult to extract from the character columns in the A-language sentence, which is already determined in notation, a concept expression involved in the sentence by the analyzer means alone.

Description is now made with respect to the conventional one-to-one coordination system, which is illustrated in FIG. 2. An input device 1 is connected to a retrieving device 9, which in turn is connected to storage devices 11 and 12 as well as to a word substituting device 10. The word substituting device 10 is connected to an output device 7. With respect to difference between the system in FIG. 2 and that shown in FIG. 1, the storage devices 11 and 12 in FIG. 2 are adapted to store sentences having identical contents of expression respectively in an A-language and a B-language in a coordinated manner. In other words, as shown in FIG. 3, a model $A_i$ (i represents an integer selected from 1 to n) in the storage device 11 formed by an sentence or words in the A-language and a model $B_i$ (i represents an integer selected from 1 to n) in the storage device 12 formed by a sentence or words in the B-language are in one-to-one coordination with each other.

The retrieving device 9, which contains means for retrieving a sentence corresponding to an A-language sentence inputted in character units by a keyboard from the storage device 11 or means for successively displaying and selecting respective models $A_i$ in the storage device 11, specifies a model $A_1$, for selection of a B-language model $B_1$ which is in one-to-one coordination therewith. The selected B-language model $B_1$ is subjected to sentence conversion to some extent by substitution of words contained therein by the word substituting device 10. A sentence from the word substituting device 10 is outputted as a B-language sentence from the output device 7.

Such a one-to-one coordination system also has the following disadvantages:

(a) Since this system is based on a requirement for inputting by character columns, there is a disadvantage identical to that pointed out in the above item (a) with respect to the aforementioned translation system.

(b) In general, an inputted natural language (A-language) has various expressions. Therefore, for processing sentence-to-sentence conversion at a level exceeding the function of an electronic dictionary, a great volume of models are required to be stored and retrieved. For satisfying such a requirement, the system needs a storage device in such a large scale that it cannot be packaged in the system in practice and a super-high-speed retrieving mechanism.

(c) The system basically has no function to make sentences for free expression by a user, since model sentences are already stored and fixed in the storage device.

As a result of our investigation of the prior art, we found the following publications.

The publication, entitled "Transition Net Work Grammar for Natural Language Analysis" published by W. A. Woods, Communications of ACM Vol. 13, No. 10, pages 591-606, October, 1970, discloses the use of augmented transition next work, (ATN) grammars for natural language analysis, which represents a rule of syntax analysis in a transition graph fashion.

The publication "WORD EXPERT PERSING" published by Chuck Rieger and Steve Small, International Joint Conference of Artificial Intelligence '79, proceeding pages 723-728, 1979 discloses an appropriate usage of words structured to a dictionary in order to properly syntax-analyze natural language sentences in various cases, with respect to the respective words. The contents of the dictionary include net work structure and procedural information, unlike a conventional item-entry type.

The paper entitled "AN ENGLISH JAPANESE MACHINE TRANSLATION SYSTEM OF THE TITLES OF SCIENTIFIC AND ENGINEERING PAPERS" published by Makoto Nagao, Junichi Tsuji, Koji Yada and Toshihiro Kakimot, COLLING 82, North-Holland Pub. 1982, pages 245-252 discloses an example of English Japanese translation. The object to be translated is the title sentences of scientific and engineering papers. Sentence structure is analyzed by, for example, transition net work and semantical treatment.

SUMMARY OF THE INVENTION

The present invention has been achieved for overcoming the aforementioned disadvantages of the prior art by providing a sentence forming apparatus which has a dictionary storing semantically related words and an input device having a smaller number of keys in comparison with a keyboard according to, e.g., the JIS arrangement so that items to be expressed are successively selected in a conversational system, thereby freely and simultaneously forming sentences in a plurality of languages semantically equivalent to each other without necessity of complicated syntax analysis.

The present invention is directed to a sentence forming apparatus comprising first storage means for storing in a correlated manner with each rather a plurality of indexes in a first language, a plurality of words in the first language semantically in coordination respectively with said indexes and grammatical information relating to said respective words, the grammatical information being semantically restricted; selection menu forming means for forming a selection menu in the first language by utilizing the contents of said first storage means; input means for inputting selective information required for forming a sentence in response to said selection menu; second storage means for storing said inputted selective information; third storage means for storing syntax information relating to grammatical syntax of the first language and word information relating to words in the first language; first sentence assembly means for assembling a sentence in the first language utilizing said selective information and said syntax information and said word information in the first language; fourth storage means for storing syntax information relating to grammatical syntax of a second language and word information relating to words in the second language; second sentence assembly means for assembling a sentence in the second language semantically equivalent to said sentence in the first language utilizing said selective information and said syntax information and said word information in the second language; and output means for outputting said selection menu, said sentence assembled by said first sentence assembly means and said sentence assembled by said second sentence assembly means.

The objects, features, aspects and advantages of the present invention will become more apparent from the following detailed description of the present invention when taken in conjunction with the accompanying drawings.

BRIEF DESCRIPTION OF THE DRAWINGS

FIGS. 6A and 6B are explanatory diagrams illustrating a syntax dictionary as shown in FIG. 4, in which FIG. 6A shows word information and FIG. 6B shows syntax information;

FIG. 7 is an illustration showing an example of an input device as shown in FIG. 4;

FIGS. 9A to 9D are hardware circuit diagrams definitely showing details of the block diagram shown in FIG. 8;

FIGS. 10A and 10B are illustrations showing operation procedure according to an embodiment of the present invention;

DESCRIPTION OF THE PREFERRED EMBODIMENTS

Figure 4:
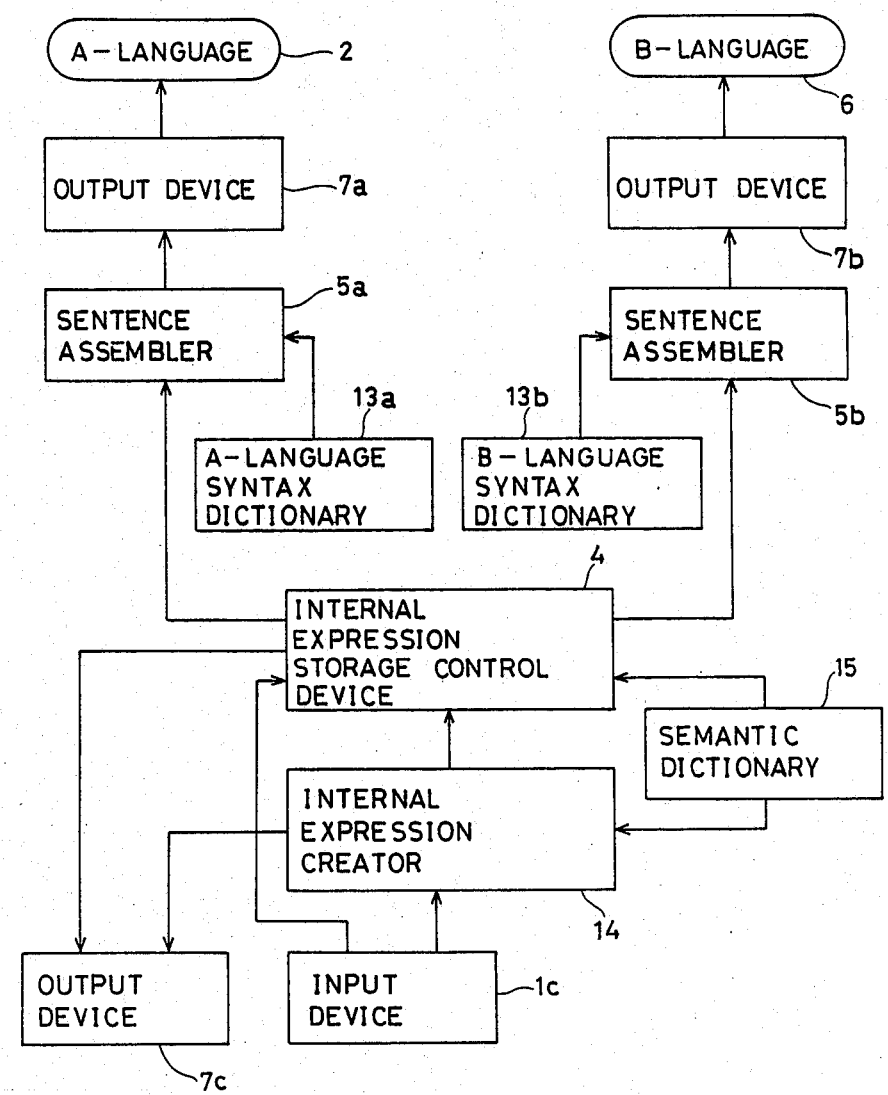
FIG. 4 is a block diagram showing functional structure of an embodiment of the present invention.

FIG. 4 is a block diagram showing functional structure of an embodiment of the present invention. This embodiment comprises a semantic dictionary 15 which is first storage means for storing in a correlated manner a plurality of indexes in a first language, e.g., an A-language, a plurality of words in the first language semantically in coordination with the respective indexes and grammatical information relating to the respective words, an internal expression creator 14 which is selection menu creating means for creating selection menu in the first language utilizing the contents of the first storage means, an input device 1c which is input means for inputting selective information required for forming a sentence in response to the selection menu, an internal expression storage control device 4 which is second storage means for storing the inputted selective information, a syntax dictionary 13a which is third storage means for storing syntax information relating to grammatical syntax of the first language and word information relating to the words in the first language, a sentence assembler 5a which is first sentence assembly means for assembling a sentence in the first language utilizing the syntax information and the word information of the first language, a semantic dictionary 13b which is fourth storage means for storing syntax information relating to grammatical syntax of a second language, e.g., a B-language and word information relating to words in the second language, a sentence assembler 5b which is second sentence assembly means for assembling a sentence in the second language semantically equivalent to the first language sentence utilizing the selective information and the word information, and output devices 7c, 7a and 7b which are output means for outputting the selection menu, the sentence assembled in the first sentence assembly means and the sentence assembled in the second sentence assembly means.

Figure 1:
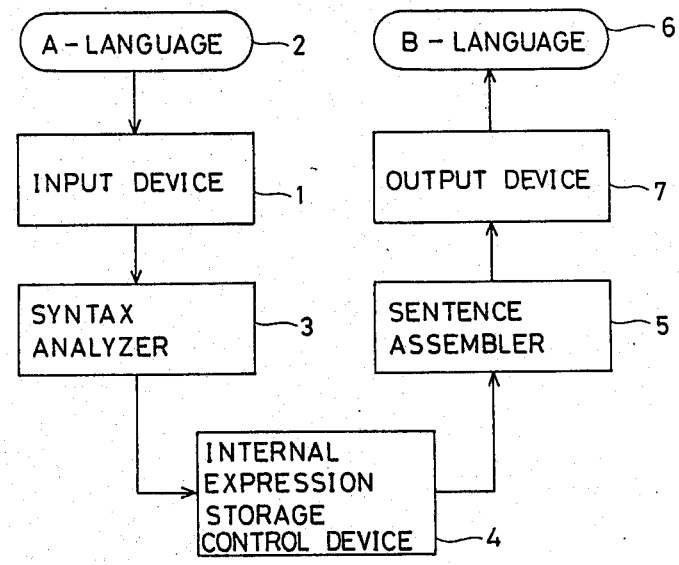
FIG. 1 is an explanatory diagram illustrative of a conventional translation system.
Figure 2:
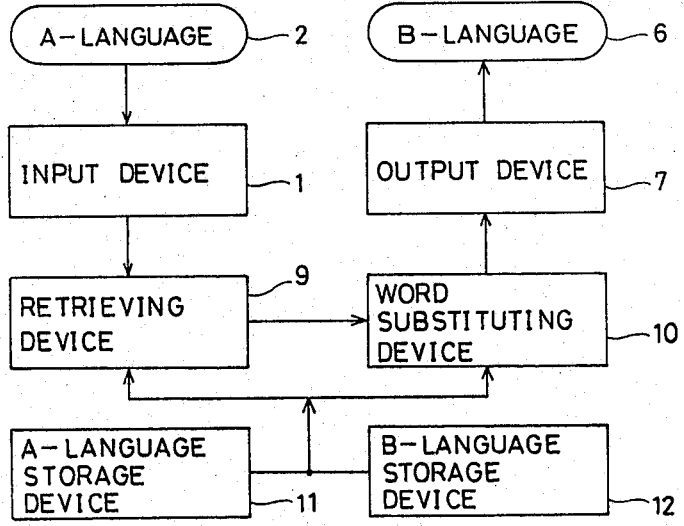
FIG. 2 is an explanatory diagram illustrative of a conventional one-to-one coordination system.
Figure 3:
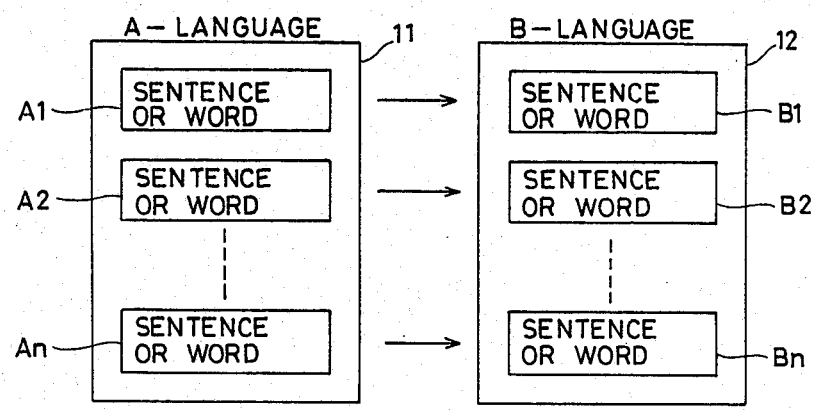
FIG. 3 is an illustration showing a storage device as shown in FIG. 2.
Figure 5:
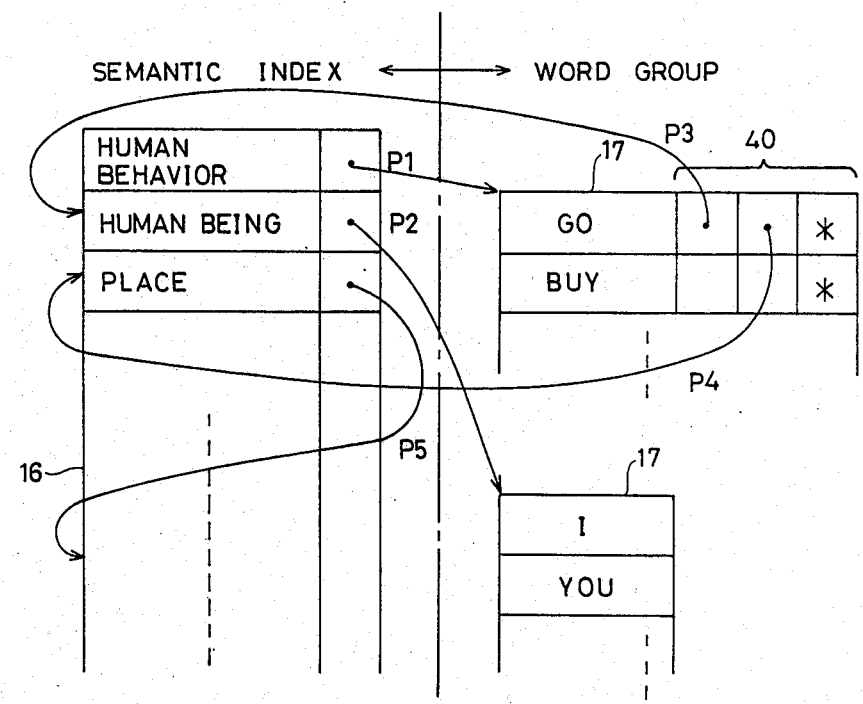
FIG. 5 is an explanatory diagram illustrating a semantic dictionary shown in FIG. 4.

FIG. 5 is an explanatory diagram illustrating the semantic dictionary 15 as shown in FIG. 4. The semantic dictionary 15 stores in a correlated manner a plurality of semantic indexes 16, word groups 17 which are semantically in coordination with the respective semantic indexes 16 and grammatical information 40 relating to the respective words in the word groups 17. In other words, respective semantic contents in the semantic indexes 16 are accompanied with pointers (address information) for designating the word groups 17 or the semantic indexes 16. The respective words in the word groups 17 are accompanied with grammatical information 40. For example, a pointer $P_1$ with respect to "human behavior" in the semantic indexes designates words such as "go" and "buy" in the word groups 17. A pointer $P_2$ with respect to "human being" in the semantic indexes 16 designates words such as "I" and "you" in the word groups 17. The semantic indexes 16 include pointers which, unlike the above, designate the contents of the semantic indexes 16, e.g., a pointer $P_5$. The grammatical information 40 accompanying the respective words in the word groups 17 comprises pointers designating, e.g., the subject and the object depending on the words and pointer end marks "*", as necessary. In case of, for example, the word "go", the pointer $P_3$ for designating the subject designates "human being" in the semantic indexes 16, and a pointer $P_4$ for designating the object designates "place". The semantic indexes 16 includes single structure and hierarchical structure. In the single structure, the semantic indexes designate the word groups (e.g., the pointer $P_1$) and the word groups designate the semantic indexes (e.g., the pointer $P_3$). In the hierarchical structure, the semantic indexes designate the word groups or the semantic indexes (e.g., the pointer $P_1$ or the pointer $P_5$) and the word groups designate the semantic indexes (e.g., the pointer $P_4$).

FIGS. 6A and 6B are illustrations showing in detail the syntax dictionaries 13a and 13b as shown in FIG. 4. The syntax dictionaries 13a and 13b store a plurality of pairs of word information as shown in FIG. 6A and further store a plurality of pairs of syntax (or sentence pattern) information as shown in FIG. 6B. The word information includes, for example, spelling of words, parts of speech, past tense, perfect tense, ... and sentence pattern codes, etc. With respect to, for example, the word "go", the syntax dictionary 13a in the A-language (e.g., Japanese) stores "iku", "doshi", "itta", "itte shimatta", ... "1-gata" etc. In coordination therewith, the syntax dictionary 13b in the B-language (e.g., English) stores "go", "verb", "went", "gone", ... "SVO" (subject+verb+object) etc. Further, as syntax information with respect to, e.g., a first pattern (1 - gata), the syntax dictionary 13a contains "subject noun", "postpositional word functioning as an auxiliary", "object noun", "postpositional word functioning as an auxiliary to a main word" and "verb". The syntax dictionary 13b contains "subject noun", "verb" and "object noun" as syntax information regarding SVO.

FIG. 7 shows an example of the input device 1c as shown in FIG. 4. The input device 1c comprises a small number of keys for selection input, i.e., expression image keys 18 for selecting an image to be expressed, sentence conversion keys 19 for selecting various sentence conversion patterns and selection keys 20 which are ten keys for various selective operations.

Figure 8:
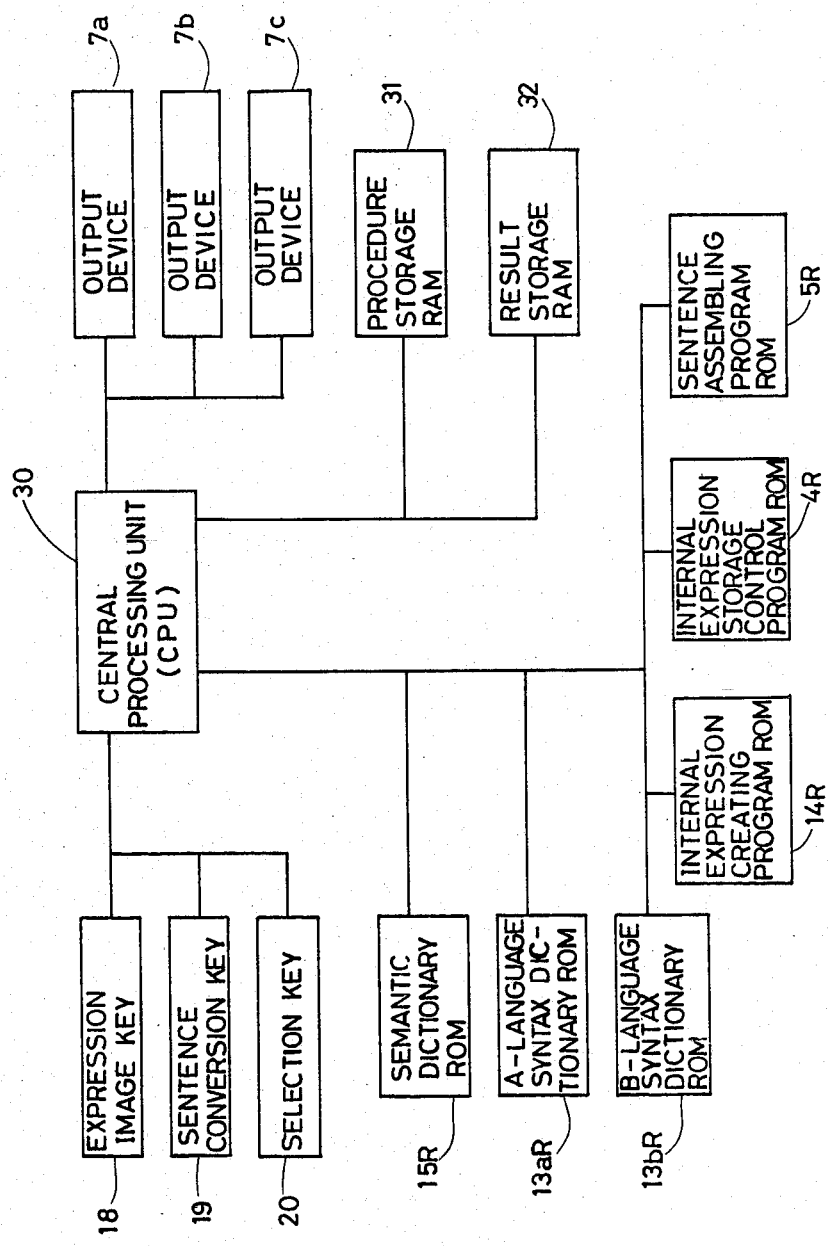
FIG. 8 is a block diagram showing hardware structure of an embodiment of the present invention.

FIG. 8 is a block diagram showing hardware structure of the embodiment of the present invention. The apparatus shown in FIG. 8 is embodied by structuring the apparatus shown in FIG. 4 by a central processing unit, input/output units and storage units. Elements shown in FIG. 8 are now described with reference to FIGS. 4 and 7. In FIG. 8, expression image keys 18, sentence conversion keys 19 and selection keys 20, which are connected to a central processing unit 30, are equivalent to those shown in FIG. 7. Output devices 7a to 7c, also connected to the central processing unit 30, are devices which can be implemented by an LCD or a CRT, and are equivalent to those shown in FIG. 4. The central processing unit (hereinafter referred to as "CPU") 30 controls functions of the respective devices as shown in FIG. 4. A semantic dictionary ROM 15R, which is connected to the CPU 30, is a ROM (read only memory) corresponding to the semantic dictionary 15 in FIG. 4. Syntax dictionary ROMs 13a R and 13bR, which are also connected to the CPU 30, respectively correspond to the syntax dictionaries 13a and 13b as shown in FIG. 4. An internal expression program ROM 14R connected to the CPU 30 functions such that the CPU 30 operates according to the content (program) thereof for implementing the internal expression creator 14 as shown in FIG. 4. An internal expression storage control program ROM 4R connected to the CPU 30 so functions that the CPU 30 operates according to its program to implement the internal expression storage control device 4 as shown in FIG. 4. A sentence assembly program ROM 5R connected to the CPU 30 so functions that the CPU 30 operates according to the content (program) thereof to implement the sentence assemblers 5a and 5b in FIG. 4. A process procedure storage RAM 31 connected to the CPU 30 is used as a work RAM (random access memory) 9 for executing various information processing operations of the CPU 30. A result storage RAM 32 connected to the CPU 30 is adapted to store, when the CPU 30 operates as the internal expression creator 14, the internal expression storage control device 4 and the sentence assemblers 5a and 5b, the results of the process therein. It is to be noted that the aforementioned expression image keys 18, the sentence conversion keys 19 and the selection keys 20 can be combined with each other by employing appropriate selection means. Further, the output devices 7a to 7c may be joined in one output device.

Figure 9B:
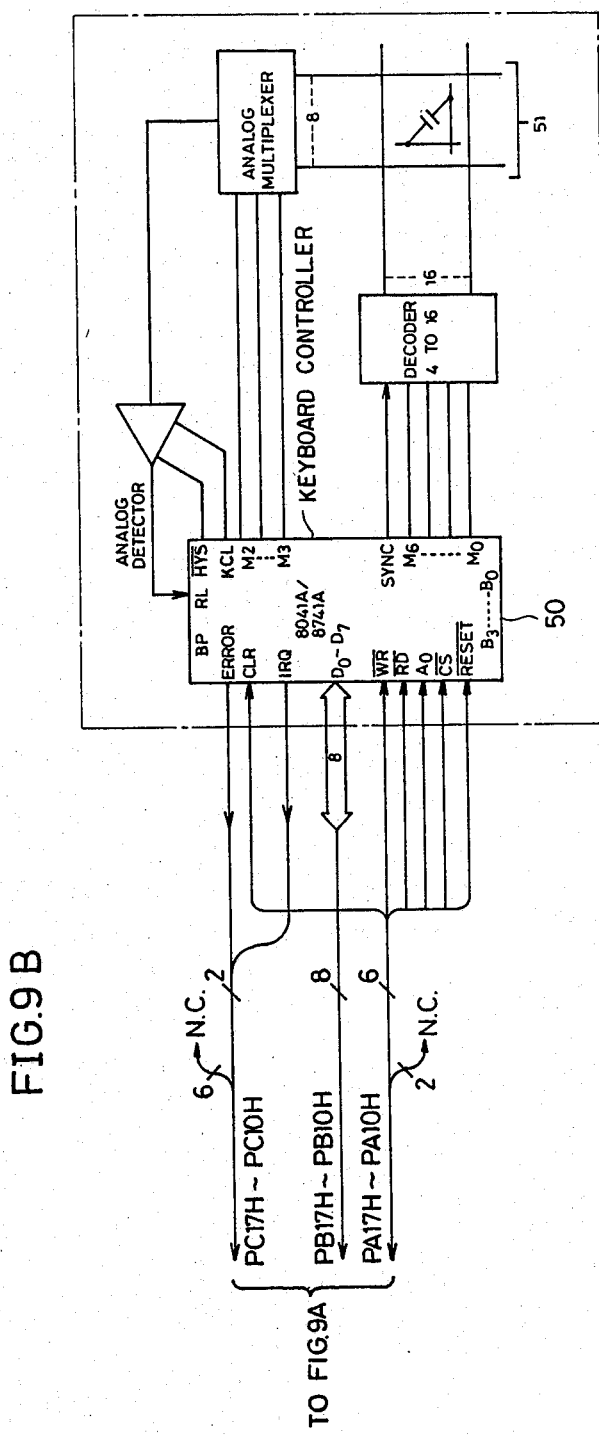
Figure 9C:
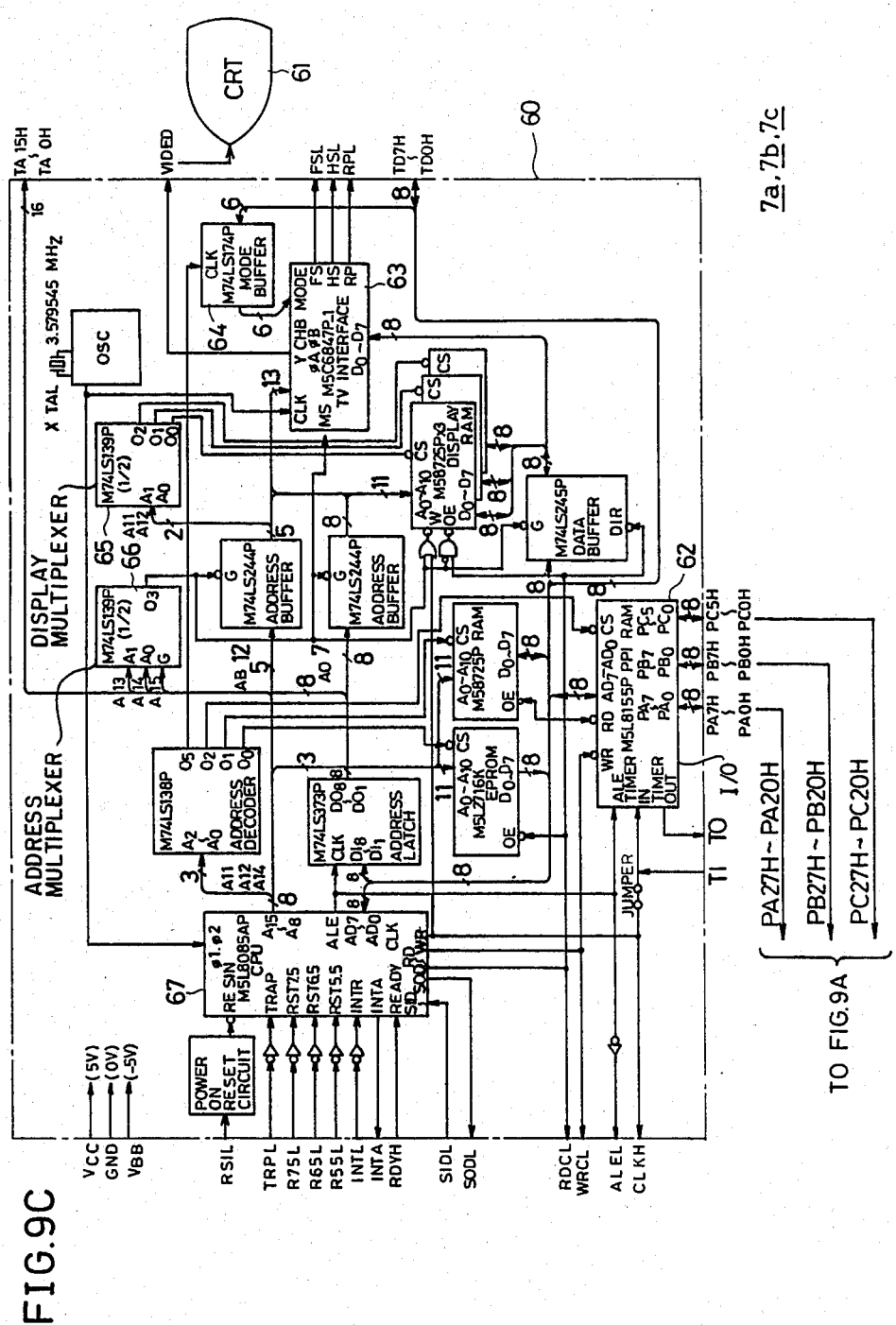
Figure 9D:
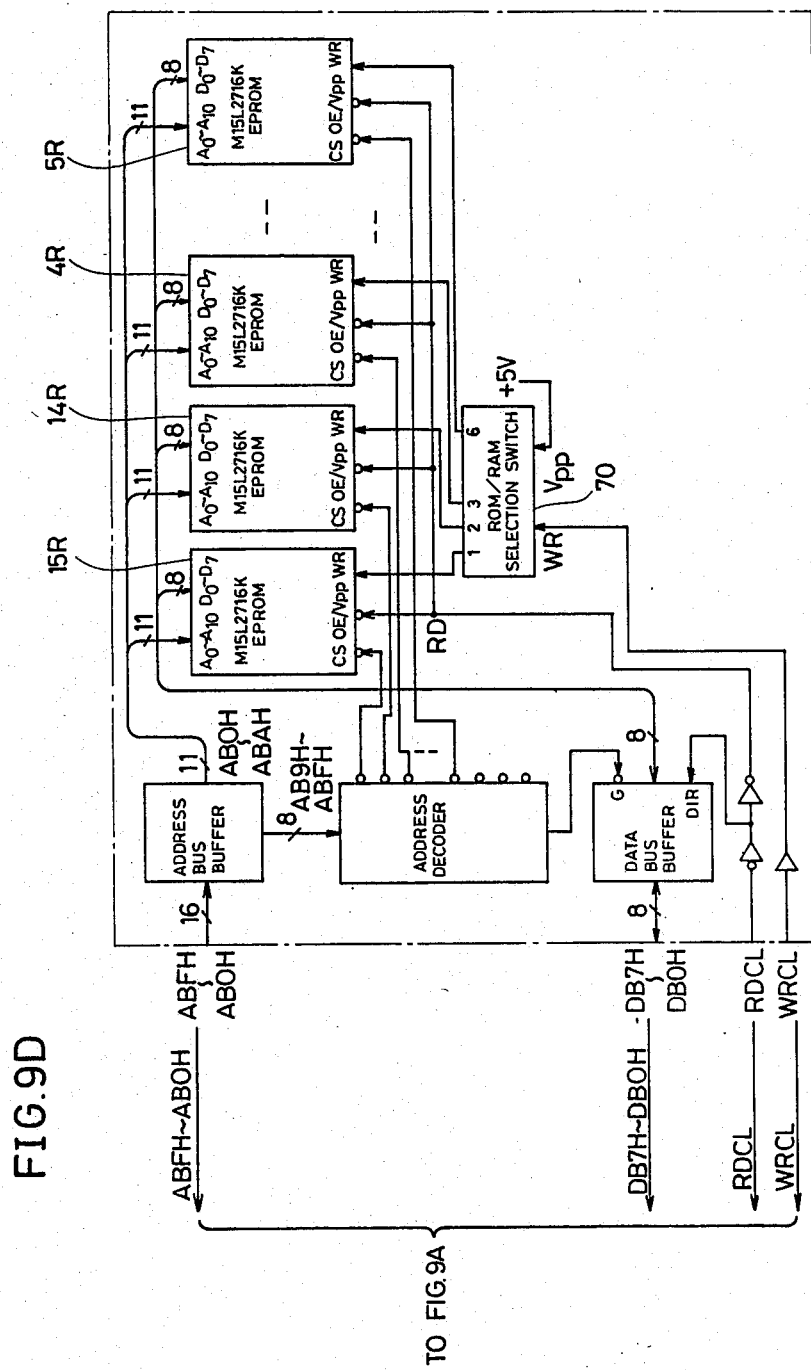

FIGS. 9A to 9D are hardware circuit diagrams definitely showing the details of the block diagram shown in FIG. 8. The circuits as shown in FIGS. 9B to 9D are connected to the circuit as shown in FIG. 9A. In FIG. 9A, there are shown the CPU 30, the syntax dictionaries 13aR and 13bR, the process procedure storage RAM 31 and the result storage RAM 32. The CPU 30 is manufactured by, e.g., i8085 of Intel (indicated by M5L8085AP in the drawings). Numerals 40 and 41 indicate input/output ports. In FIG. 9B, the expression image keys 18, the sentence conversion keys 19 and the selection keys 20 are implemented in one circuit. Numeral 50 indicates a keyboard input controller manufactured by, e.g., Intel, and numeral 51 indicates an electrostatic keyboard matrix. In the drawing, reference letters N.C. indicates non-connection. In FIG. 9C, the output devices 7a to 7c are implemented in one output control circuit 60 and one CRT 61. Numeral 62 indicates an input/output port manufactured by, e.g., i8155 of Intel (indicated by M5L8155P in the drawings). A TV interface 63 and a mode buffer 64 form a video signal controller, in which, for example, the former is manufactured by MC6847 of Motorola and the latter is manufactured by TI74LS174 of Texas Instruments. Numeral 65 indicates a display switching multiplexer while numeral 66 indicates an address multiplexer. Numeral 67 indicates a CPU manufactured by, e.g., i8085 of Intel (indicated by M5L8085AP in the drawings). FIG. 9D shows the semantic dictionary ROM 15R, the internal expression creating program ROM 14R, the internal expression storage control program ROM 4R and the sentence assembly program ROM 5R. Numeral 70 indicates a ROM/RAM selection switch, which exclusively selects the ROM in this case.

Figure 10A:
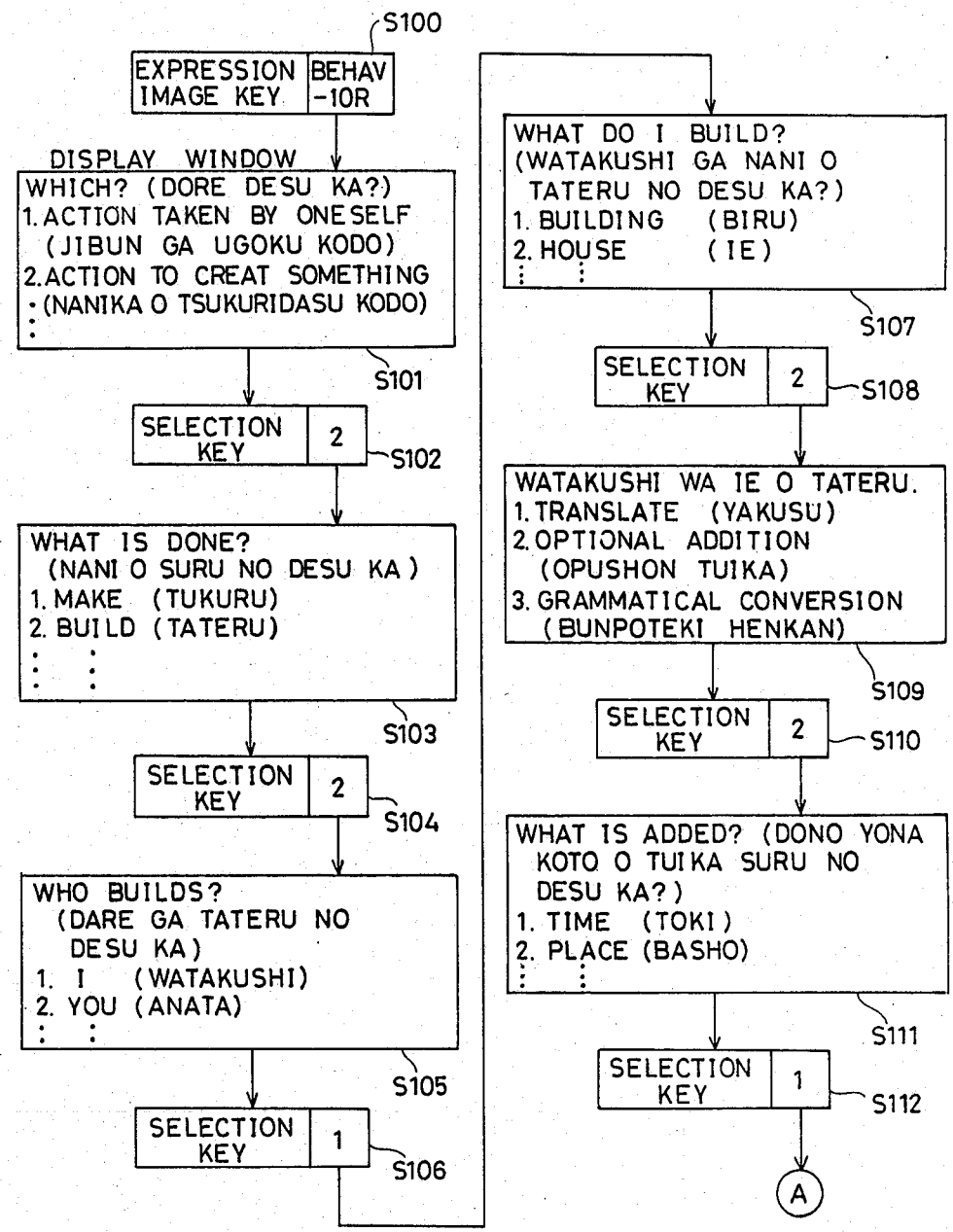

Operations of the embodiment of the present invention are now described in detail. FIGS. 10A and 10B are illustrations showing the operation procedure according to the present embodiment. The procedure in FIG. 10A are followed by the procedure in FIG. 10B. The A-language and the B-language are assumed to be Japanese and English respectively in this specification, although they can be freely selected in substance. Further, the sentences to be formed are assumed here to be those in Japanese and English in the meaning of "I built my house last year." (Watakushi wa sakunen ie o tateta), when expressed by the A-language, although they can be freely selected in substance.

Since, in this case, the sentences to be formed relate to human behavior, a key reading "Behavior of human being and creature" (Ningen ya ikimono no kodo) included in the expression image keys 18 in the input device 1c is pushed down by the user at a step S100. The information thus selected by the key is stored as selective information in the internal expression storage control device 4. Similar operation is repeated in the subsequent procedure. At a step S101, the internal expression creator 14 detects the pushdown of the key to fetch the content sorted as "Behavior of human being and creature" (Ningen ya ikimono no kodo) from the hierarchically structured semantic indexes 16 in the semantic dictionary 15, that is, to retrieve more specific semantic indexes or a word group from the semantic dictionary 15, thereby displaying the same on the output device 7c as a selection menu in Japanese. Since, in this case, it is clear that the image to be expressed relates to "2. Action to create something" (2. Nanika o tukuridasu kodo) in the contents displayed at the step 101, a key "2" in the selection switches 20 is pushed down at a step S102.

Then, at a step S103, the internal expression creator 14 detects the pushdown of the key "2", so that the word group 17 (mainly verbs) designated by the semantic indexes 16 in the meaning of "Behavior of human being and creature" (Ningen ya ikimono no kodo) as well as "Action to create something" (Nanika o tukuridasu kodo) is displayed on the output device 7c. Simultaneously displayed at this time is a message showing a selection guideline reading, e.g., "What does it do?" (Nani o suru no desuka ?). Since it is clear that "2. build" (2. tateru) is to be selected for forming a sentence in the aforementioned meaning, a selection key "2" is pushed down at a step S104. Thus, the word "build" (tateru) is selected from the word group 17 designated by the semantic indexes 16.

Then, since there is required information regarding the subject of action, i.e., the subject word, a message "Who builds?" (Dare ga tateru no desu ka ?) in which the word "Who" (Dare ga) is annexed to the word "builds" (tateru) is simultaneously displayed as a guidance at a step S105. Similarly at the subsequent steps, the internal expression creator 14 operates such that the word group is limited by the input device 1c, the output device 7c, the internal expression creator 14 and the semantic dictionary 15 to avoid semantic unnaturalness and is displayed to be selected by the user. In other words, when the key "1" in the selection keys 20 is pushed down at a step S106, a message reading "What do I build?" (Watakushi ga nani o tateru no desu ka ?) is displayed at a step S107 while the word group 17 which is not unnatural as the object of the word "build" (tateru). When, at a step S108, the key "2" in the selection keys 20 is pushed down, one subject and one object are determined as minimum elements required for action in the meaning "build" (tateru). Thus, there is created a minimum required concept for forming the object sentence. Since information relating to semantically required minimum elements, i.e., grammatical information varies with the words, particularly verbs, the respective words in the word group 17 as stored in the semantic dictionary 15 are accompanied with grammatical information 40.

In the foregoing steps, the action "build" (tateru), the subject of action "I" (watakushi) and object of action "house" (ie), which are the elements for forming the sentence "I build my house." (Watakushi wa ie o tateru.) in Japanese are stored in the internal expression storage control device 4 as specific internal expressions, which in turn are transitted from the internal expression storage control means 4 to the sentence assembler 5a. The sentence assembler 5a fetches a Japanese word "tateru" semantically corresponding to the internal expression in the meaning of "build", a Japanese word "watakushi" semantically corresponding to the internal expression "I" and a Japanese word "ie" semantically corresponding to the internal expression "house" from the syntax dictionary 13a, and further fetches grammatical information (syntax information) in the A-language (Japanese) from the syntax dictionary 13a. Since, in this case, the internal expressions and the A-language in the syntax dictionary 13a or the B-language in the syntax dictionary 13b are stored in one-to-one coordination with each other such that, for example, the internal expression "build" and the A-language word "tateru" in the syntax dictionary 13a or the the B-language word "build" in the syntax dictionary 13b are stored in one-to-one coordination, an A-language word or a B-language word semantically corresponding to an internal expression can be easily fetched as hereinabove described. In assembling of a sentence, it is necessary in Japanese to assemble the same in the order of "subject of action", "object" and "verb", and further, with respect to the present case, it is required to supply postpositional words as auxiliaries in the order of "subject of action" "wa" "object" "o" and "verb". Thus, syntax information and the like for executing such sentence assembly operation are successively fetched from the syntax dictionary 13a. The aforementioned sentence "I build my house." (Watakushi wa ie o tateru.) is assembled in this manner in the sentence assembler 5a, which assembled sentence is displayed on the output device 7a.

When the semantically required minimum elements are determined in the foregoing manner, a Japanese sentence, "Watashi wa ie o tateru." in this case, is displayed on the output device 7a, thereby making a display to demand the user subsequent designation. For example, "1. translate, 2. optional addition, 3. grammatical conversion" (1. yakusu, 2. opushon tuika, 3. bunpoteki henkan) and the like are displayed as the contents of such a demand display at a step S109 in FIG. 10A. At this time, i.e., upon completion of inputting of the required minimum elements of the sentence, control of the demanded designation is transitted from the internal expression creator 14 to the internal expression storage control device 4.

In the internal expression storage control device 4, sentence conversion is repeated according to the aforementioned display and the sort of selective information from the user. With reference to FIGS. 10A and 10B, for example, when a selection key "2" representing optional addition is pushed down at a step S110, the internal expression storage control device 4 makes the output device 7c output and display a selection menu with guidance "What is added?" (Donoyona koto o tuikasuru no desuka ?) for adding additional information required by the sentence to be assembled at a step S111. If conjugation in the tense is to be processed in this case, a selection key "1" is pushed down at a step S112. Upon detection of the pushdown, the internal expression storage control device 4 fetches at a step S113 words relating to time such as "now", "today", "last year" from the word group 17 designated by the semantic indexes 16 from the semantic dictionary 15 to display the same with "When does it happen?" (Itu no dekigoto desu ka ?) on the output device 7c. When the word "last year" are to be selected, a selection key "3" is pushed down at a step S114. Thus, in a similar manner to the above, the sentence assembler 5a makes the output device 7a display a sentence "Watakushi wa sakunen ie o tateta.". At this time, the internal expression storage control device 4 therein generates elements forming the above sentence and sentence forming procedure, i.e., order and contents of the pushed keys. In other words, information regarding the content of action (verb), the subject of action (subject noun), object (object noun) and the tense is generated in the internal expression storage control device 4.

The foregoing sentence is displayed at a step S115 with a selection menu. When a selection key "1" is pushed down at a step S116, the internal expression storage control device 4 transits an internal expression corresponding to the Japanese sentence "Watakushi wa sakunen ie o tateta." to the sentence assembler 5b for translating the same into the B-language. At a step S117, the sentence assembler 5b selects an English word "built" semantically corresponding to the word "tateta", an English word "I" semantically corresponding to "watakushi", an English word "house" semantically corresponding to "ie" and English words "last year" semantically corresponding to "sakunen" from the syntax dictionary 13b in the B-language (English). Further, the sentence assembler 5b also fetches grammatical information in English from the syntax dictionary 13b. For example, it is necessary in English to assemble a sentence in the order of "subject of action" "verb" "object" and "expression of the tense", and in this case, a word "my" representing possession by the subject of action as a definitive with respect to the object, while information for sentence generation is also fetched from the syntax dictionary 13b. Thus, a sentence "I built my house last year." is displayed on the output device 7b. In such a manner, the object sentence in Japanese is generated and displayed in English.

Description is now made with respect to conversion of a sentence by various grammatical converting operations. In the present embodiment, the sort of sentence conversion can be selected from the following:
(1) conversion of a sentence into an affirmative sentence, an imperative sentence, an interrogative sentence, a question sentence or a negative sentence;
(2) conversion of a sentence into a politely expressed sentence, a wishfully expressed sentence or the like;
(3) conversion of the tense of a sentence into the present tense, the past tense, the future tense or various kinds of the perfect tense;
(4) conversion of a sentence into that in the subjunctive mood, the passive voice or the active voice;
(5) conversion of a sentence into a compound sentence or a complex sentence; and
(6) others.

Such conversion is executed by pushing down a key desirably selected from the sentence conversion keys 19 in the input device 1c. Description is hereafter made with respect to a case where, for example, the foregoing sentence "I built my house last year." (Watakushi wa sakunen ie o tateta.) is grammatically converted into a negative sentence. When, at a step S118 in FIG. 10B, a selection key "3" is pushed down for executing the grammatical conversion, the internal expression storage control device 4 detects the pushdown to display guidance reading "Which grammatical conversion is selected? Push the sentence conversion key." (Dono bunpoteki henkan o suru no desuka ? Bunshyohenkankii o oshite kudasai.) on the output device 7c. Since the sentence is to be converted into a negative one in this case, a key representing "negative" in the sentence conversion keys 19 is pushed down at a step S120. The internal expression storage control device 4 detects the pushdown, to transit internal expression information and the subject grammatical conversion information (i.e., "negative") to the sentence assembler 5a. The sentence assembler 5a fetches necessary information from the syntax dictionary 13a in a similar manner to the above for assembling a sentence, thereby to display at a step S121 a sentence "Watakushi wa sakunen ie o tatenakatta." on the output device 7a. When, similarly to the above, this sentence is to be converted into the B-language (English), a selection key "1" is pushed down at a step S122. Thereupon the sentence assembler 5b fetches necessary information from the syntax dictionary 13b to assemble an English sentence "I did not build my house last year.", thereby displaying the same on the output device 7b at a step S123. Similar operations are executed for enabling other kinds of sentence conversion.

Figure 11:
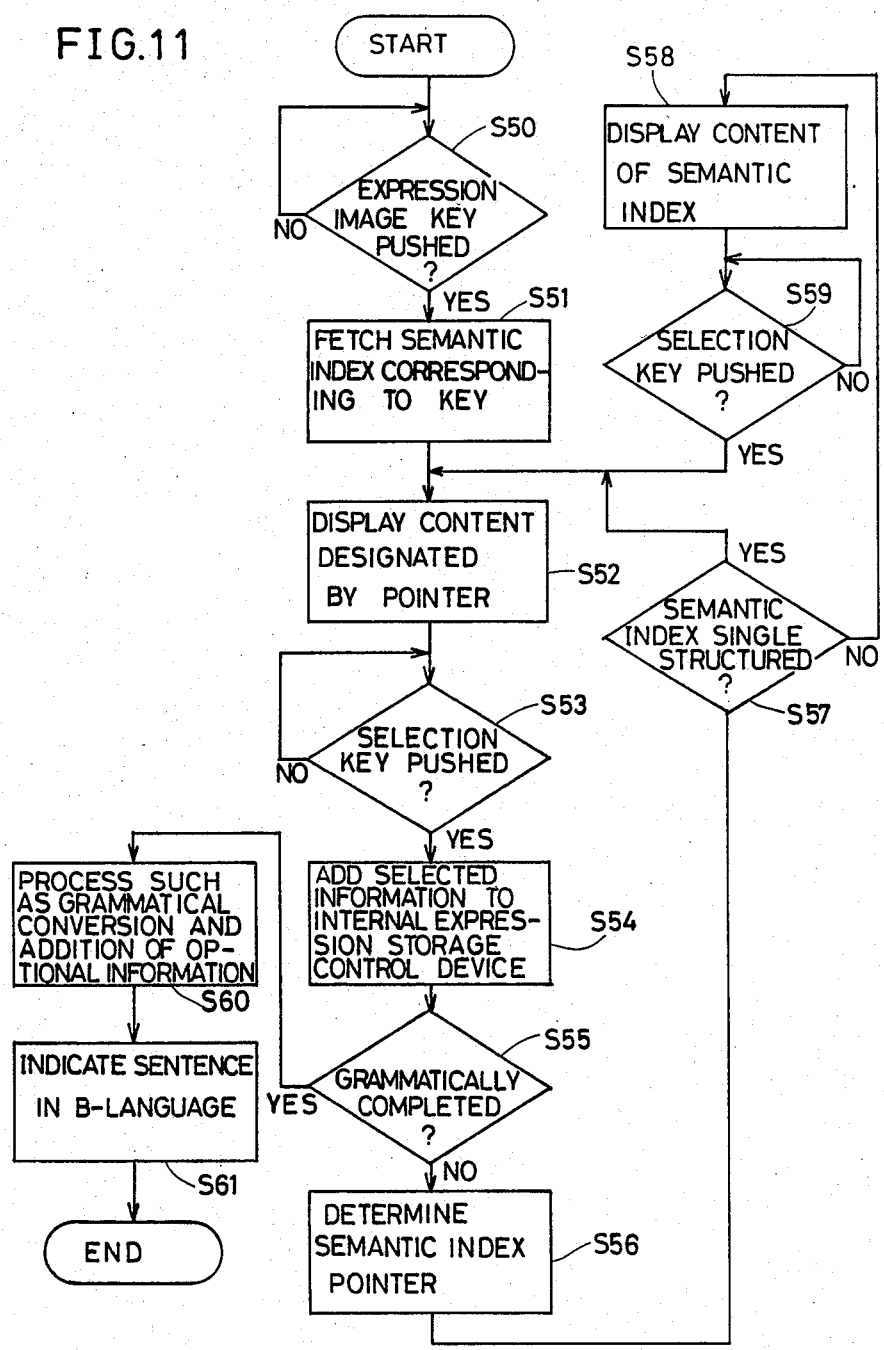
FIG. 11 is a flow chart showing operation of the embodiment of the present invention.

The aforementioned operations, i.e., the entire operations of the apparatus as shown in FIG. 4 (or FIG. 8) are arranged in a flow chart illustrated in FIG. 11. At a step S50, a determination is made by the internal expression creator 14 as to whether or not the expression image keys 18 are pushed. If the determination is "yes", the semantic indexes corresponding to the pushed keys are fetched from the semantic dictionary 15 at a step S51, and at a step S52, contents designated by the semantic index pointers are displayed on the output device 7c. At a step S53, a determination is made by the internal expression creator 14 as to whether or not the selection keys 20 are pushed. If the determination is "yes", selective information regarding the same is added to the internal expression storage control device 4 at a step S54. At a step S55, a determination is made as to whether or not assembling of a sentence is grammatically completed, i.e., whether or not minimum elements required for assembling a sentence are defined. Such a determination is made by making a determination as to whether or not grammatical information 40 accompanying the respective words in the word group 17 in the semantic dictionary 15 shown in FIG. 5 is completely satisfied by the image expression creator 14. For example, when contents designated by the pointers accompanying the respective words in the word group 17 are entirely satisfied, or, when the pointer end mark *, in case the same is provided, is detected, a determination "grammatically completed" is made to indicate that the semantically required minimum elements are obtained. When the determination is "yes", process operations such as grammatical conversion and addition of optional information are executed at a step S60, the process operations of which are hereinafter described in further detail with reference to FIG. 12. Then, at a step S61, a sentence is displayed in the B-language. Consequently, the operations are completed. If the grammatical process is not completed, the semantic index pointers are determined at a step S56 utilizing the designation pointers corresponding to the words and the grammatical information. At a step S57, a determination is made as to whether or not the semantic indexes are in single structure or in hierarchical structure. Since, in case of single structure, the semantic indexes are not required to be further selected, the process is advanced to the step S52, at which the word group designated by the semantic index pointers is displayed on the output device 7c for demanding subsequent selection. When, to the contrary, the retrieved semantic indexes are in hierarchical structure, further selection is required for semantic designation, and the contents of the semantic indexes are displayed at a step S58 on the output device 7c, and at a step S59, the contents of the semantic indexes are specified by the selection keys 20. Then, at the step S52, the word group included in the defined semantic indexes is displayed for demanding subsequent selection. Such operations at the steps S52 through S59 are continued until grammatical completion.

Figure 12:
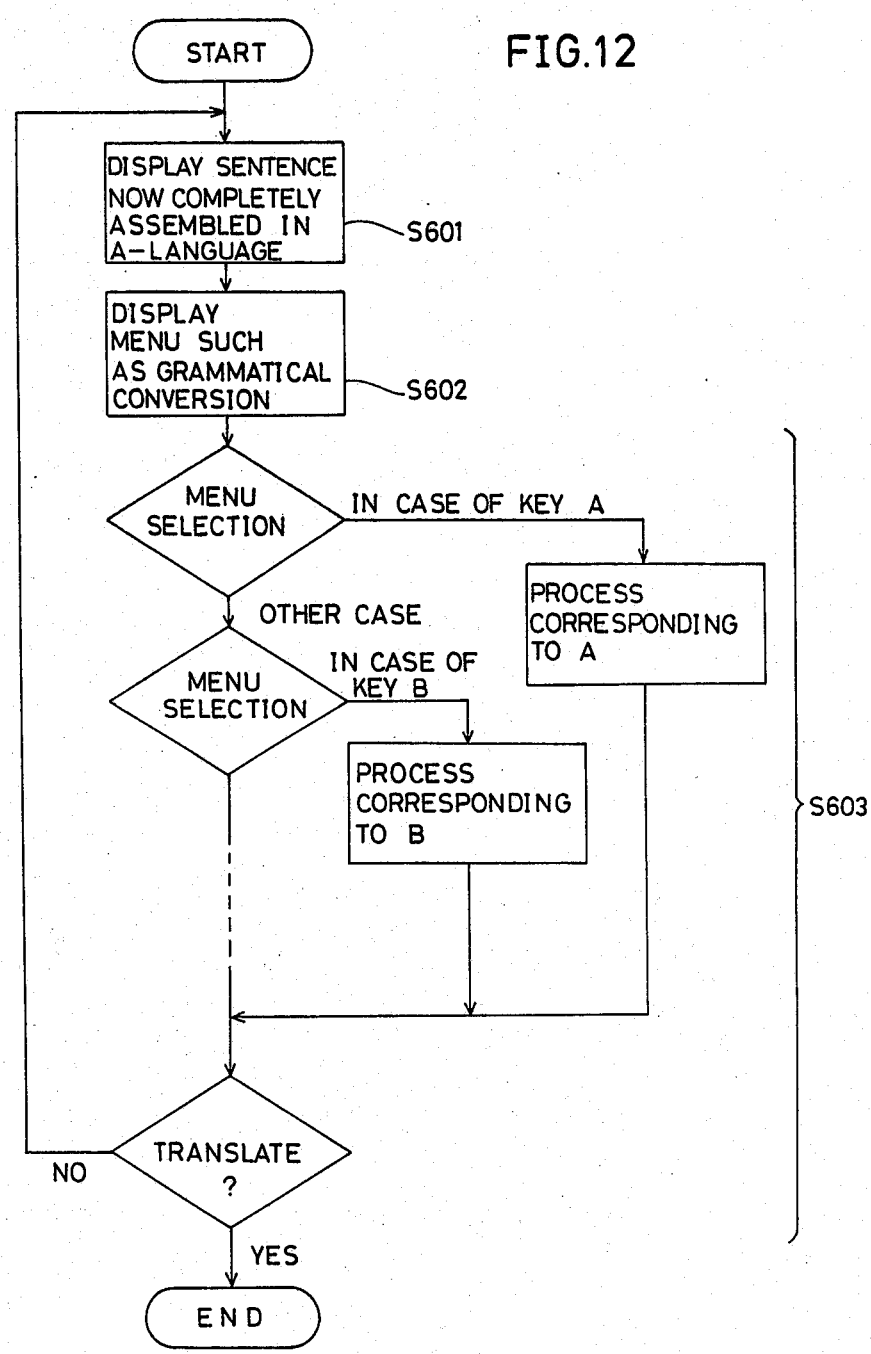
FIG. 12 is a flow chart showing details of operations at a step S60 shown in FIG. 11.

FIG. 12 is a flow chart for showing in detail the operation at the step S60 as shown in FIG. 11. At a step S601, the sentences now completely assembled is displayed on the output device in the A-language, and at a step S602, a menu relating to grammatical conversion or the like is also displayed on the output device. At a step S603, menu selection is executed by the sentence conversion key 19 and the selection key 20, followed by a process in coordination with the selected content, and finally a determination is made as to whether or not the sentence is to be translated into the B-language. If the determination is "yes", the process is advanced to the step S61 as shown in FIG. 11.

Figure 13:
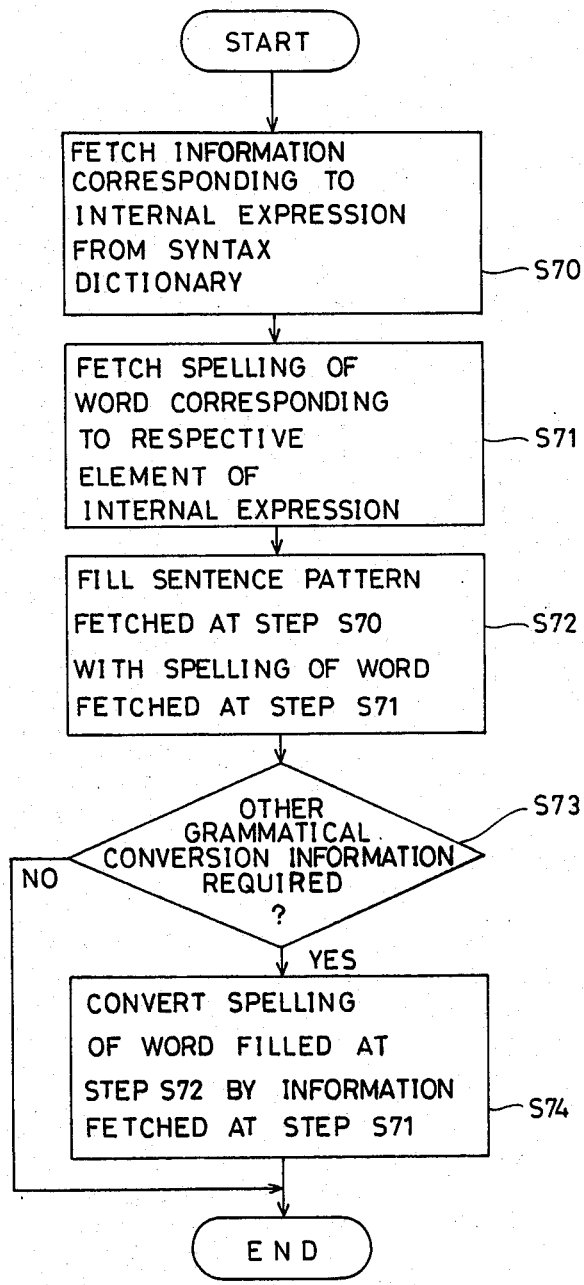
FIG. 13 is a flow chart showing operations of a sentence assembler at a step S61 shown in FIG. 12.

FIG. 13 is a flow chart showing the operations of the sentence assembler 5a at the step S601 as shown in FIG. 12. At a step S70, information regarding a sentence pattern (sentence structure) corresponding to the internal expression (e.g., verb) is fetched from the syntax dictionary 13a. For example, when the internal expression is "go", the first pattern syntax information (e.g. SVO) is fetched. At a step S71, spellings of words corresponding to the respective elements of the internal expression are fetched from the syntax dictionary. For example, the subject of action "I" and the object "school" are fetched. At a step S72, the spellings fetched at the step S71 are filled in the sentence pattern fetched at the step S70. Thus, for example, a sentence "I go to school." is assembled. At a step S73, a determination is made as to whether or not other grammatical conversion information is required. If the determination is "yes", then at a step S74, the spellings of the words as filled at the step S72 are converted utilizing other information fetched at the step S71. In case of, e.g., conversion into the past tense, the word "go" is converted into the word "went". Thus, assembling of the sentence is completed in the sentence assembler 5a, whereby the assembled sentence is displayed on the output device 7a. It is to be noted that, although the above description is made with respect to the sentence assembler 5a, operations in the sentence assembler 5b are substantially identical thereto.

Though Japanese and English are employed respectively as the A-language and the B-language in the above description, any languages including natural languages and artificial languages may be substituted therefor. In addition, any language may be employed in displaying the guidance and the selection menu hereinabove described with respect to Japanese. Further, although the sentence conversion is performed between two languages in the aforementioned embodiment, the present invention may obviously be applied to three or more languages. In the above description, selection of a translation menu is required for displaying the B-language with priority given to the A-language, though, the A-language and the B-language may simultaneously be displayed on the output device in the grammatical information generating process, i.e., the internal expression generating process.

Although it is not mentioned in the above, a function for defining a sentence by adding definitives or adjectives to nouns therein can be implemented by storing adjective groups designated by indexes which can be semantically annexed to the nouns. In other words, restriction can be made such that no selection is admitted except for a normal sentence expression. For example, an expression "nice breakfast" can be selected while "red breakfast" cannot. Such selection of adjectives or the like may properly be executed in a menu selection system. Further, the expression image keys 18 and the sentence conversion keys 19 may be omitted by displaying the contents on the output device for menu selection.

Although the ROM and the RAM are employed in the above description, the storage devices may be implemented by magnetic storage devices such as a magnetic disk including a floppy disk, a magnetic recording tape, a bubble memory and a wire memory, and an optical disk may be substituted for the ROM. Further, the pushbutton switch employed as the input device may be replaced by a touch panel, a joy stick, an X-Y table or a mouse input device. The output device may be implemented by an LCD (liquid crystal display), a CRT display, a plasma display, a line printer, an X-Y plotter, an electrostatic printer, a heat sensitized printer, a discharge printer, a fluorescent indicator tube, a paper tape or a magnetic storage device.

The sentence forming apparatus according to the present invention may be applied to a language training device, robot programming and a translation facsimile etc. Particularly when applied to a language training device, the learner can easily comprehend sentence patterns.

According to the present invention, as hereinabove described, sentences in a plurality of languages can readily be formed without requiring special knowledge by merely executing small number of key input operations in accordance with guidances.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sentence forming apparatus comprising:

first storage means for storing in a correlated manner with each other a plurality of indexes in a first language, a plurality of words in the first language semantically in coordination respectively with said indexes and grammatical information relating to said respective words, the grammatical information being semantically restricted;

selection menu forming means for forming a selection menu in the first language by utilizing the contents of said first storage means;

input means for inputting selective information required for forming a sentence in response to said selection menu;

second storage means for storing said inputted selective information;

third storage means for storing syntax information relating to grammatical syntax of the first language and word information relating to words in the first language;

first sentence assembly means for assembling a sentence in the first language utilizing said selective information and said syntax information and said word information in the first language;

fourth storage means for storing syntax information relating to grammatical syntax of at least one second language and word information relating to words in the at least one second language;

second sentence assembly means for assembling a sentence in the at least one second language semantically equivalent to said sentence in the first language utilizing said selective information and said syntax information and said word information in the at least one second language; and output means for outputting said selection menu, said sentence assembled by said first sentence assembly means and said sentence assembled by said second assembly means.

2. A sentence forming apparatus in accordance with claim 1, wherein said at least one second language includes a plurality of different languages.

3. A sentence forming apparatus in accordance with claim 1, wherein said output means include:

first output means for outputting said selection menu;

second output means for outputting said sentence assembled by said first sentence assembly means; and third output means for outputting said sentence assembled by said second sentence assembly means.

* * * * *